United States Patent [19]

Basile

[11] 3,961,855
[45] June 8, 1976

[54] RETAINER FOR SECURING OPERATING ELEMENTS TO CONTROL SHAFTS

[75] Inventor: Peter A. Basile, Edison, N.J.

[73] Assignee: Amerace Corporation, New York, N.Y.

[22] Filed: May 22, 1974

[21] Appl. No.: 472,441

[52] U.S. Cl. .............................. 403/329; 403/361; 403/372
[51] Int. Cl.² .......................................... F16D 1/06
[58] Field of Search ........... 403/357, 372, 383, 361, 403/329; 285/319; 16/121; 74/553; 292/353, 349; 339/256 SP

[56] References Cited
UNITED STATES PATENTS

| | | | |
|---|---|---|---|
| 2,293,491 | 8/1942 | Cox | 85/85 |
| 2,968,504 | 1/1961 | Hansen | 403/357 |
| 2,996,026 | 8/1961 | Batcheller | 339/256 SP |
| 3,130,990 | 4/1964 | Leitmann | 403/357 |
| 3,329,452 | 7/1967 | Ammon | 292/353 X |
| 3,730,571 | 5/1973 | Van Buren | 403/365 |
| 3,768,845 | 10/1973 | Gilliland | 403/372 |

*Primary Examiner*—Andrew V. Kundrat
*Attorney, Agent, or Firm*—S. Michael Bender

[57] ABSTRACT

A retainer for securing an operating knob to a control shaft comprised of an elongate member having a hollow interior and respective ends each having a periphery in first part arcuate and in second part substantially straight includes a slit extending longitudinally in the periphery first part to provide opposed arcuate sections for resiliently engaging the interior walls of the knob and the periphery second part embodies spring fingers for engaging the control shaft. In its preferred form, the retainer includes longitudinally extending spring fingers joined to one another interiorly of the retainer, one spring finger having a greater average section modulus than that of the other spring finger.

13 Claims, 2 Drawing Figures

RETAINER FOR SECURING OPERATING ELEMENTS TO CONTROL SHAFTS

FIELD OF THE INVENTION

This invention relates to retainers for use in securing operating elements to rotative control shafts.

BACKGROUND OF THE INVENTION

Rotative control shafts in use in television receivers and the like typically embody an extension of generally D-shaped cross-section adapted for engagement with an operating element comprising a knob having a recess of like cross-section. For securing the operating element to the control shaft, the art has looked to various retainers in the form of spring clips typically resiliently engaging the shaft extension periphery and the operating element interior. Such retainers are customarily inserted into and are entirely contained by the operating element and include a projection or like means preventing rotation and/or axial displacement thereof relative to the operating element.

Known operating element-contained retainers comprised of elongate slit sleeves of elastic sheet material formed in such D-shaped cross-section, such as are shown in U.S. Pat. No. 2,968,504, No. 2,745,689 and No. 2,080,361, incorporate the above-mentioned projection and embody spring fingers or the like extending interiorly from an arcuate part of the retainer periphery to resiliently engage the control shaft for maintaining the same in secured relation to the operating element. Such arcuate periphery part itself resiliently engages the operating element interior wall.

Apart from the foregoing common structural features, the referenced operating element-contained retainers are characterized by differences in symmetry of their construction. For instance, the latter two patents disclose retainers configured such that an exclusive one of the opposed ends thereof is first insertable in the operating element and the spring fingers thereof are longitudinally unsymmetrical, whereas either end of the retainer of the first-mentioned patent is first insertable in the operating element and the spring fingers thereof are longitudinally symmetrical.

The art has also looked to some extent to retainers engageable with the peripheries of both the shaft extension and the operating element. Thus, U.S. Pat. No. 2,733,083 discloses a retainer having a periphery comprised of an arcuate part for encircling a hollow D-shaped extension of the operating element and a straight part, operative together with the hollow D-shaped extension to envelop a shaft extension of like D-shape, and embodying a spring finger engaging the control shaft and urging the same into engagement with the operating element interior.

In performance, known retainers are considered to achieve less than desired performance levels. In respect of the first-mentioned operating element-contained retainers, this consideration is based on the apparent dependence thereof on quite close tolerance required of the diameter of the control shaft extension, particularly insofar as the constancy of such diameter defines the shaft extension periphery engaged by the retainer spring fingers. In respect of the retainer disclosed in the last-mentioned patent, this consideration is based on the apparent dependence thereof on quite close tolerances required of both the control shaft extension diameter and the diameter of the operating element extension. This latter arrangement is further considered to be less than desired as requiring tooth and groove engagement as between the operating element exterior periphery and the retainer and in appearance since the retainer element is not contained by the operating element but is exposed thereon.

Other considerations arise in respect of forces involved in inserting the control shaft extension into the assembled operating element and retainer and in extracting the shaft from the assembled operating element and retainer. In some instances, the maximum allowable insertion force is determined largely by the nature of the mechanism controlled by the control shaft. Where such mechanism is relatively delicate, the maximum allowable insertion force may be limited to as low as 15 pounds. To maximize extraction force given such 15 pound upper limit, the retainer desirably should exhibit a high ratio of extraction force to insertion force. Known retainers are considered not to exhibit this ratio in as high a magnitude as is desired, thus providing lesser than desired extraction force.

A further observation concerning known retainers relates to the matter of the stress induced in their spring fingers as the control shaft applies bending moments thereto. In this respect, known retainers do not define spring finger structure facilitating equal distribution of bending moments and equalization of stress as between the spring fingers.

SUMMARY OF THE INVENTION

It is an object of this invention to provide improved retainers for use in securing operating elements to control shafts having generally D-shaped extensions.

It is a further object of the present invention to provide retainers having improved ratios of extraction force to insertion force.

It is a still further object of this invention to provide retainers having improved stress distribution.

In the attainment of the foregoing and other objects, preferred retainers of the invention exhibit a high ratio of extraction force to insertion force, are dependent more upon shaft extension height tolerance than upon constancy of the diameter of the control shaft, are substantially independent of the tolerance of the exterior diameter of the operating element and equalize stress as between the spring fingers thereof. Other retainers of the invention may include these features individually or in lesser combination than in the preferred retainers. Such preferred retainers constructed in accordance with the invention are comprised of an elongate member having a hollow interior, respective ends of the member defining a periphery in first part arcuate and in second part substantially straight or flat, the periphery first part having a slit extending longitudinally along the retainer and separating sections of such arcuate first part, the periphery second part embodying spring means extending therefrom into the retainer interior. The longitudinal slit is reduced in width upon containing insertion of the retainer into the operating element whereupon the sections of the periphery first part resiliently engage interior walls of the operating element. The spring means frictionally engages the shaft extension upon subsequent insertion of the same into the retainer. The spring means is preferably in the form of first and second spring fingers extending longitudinally interiorly of the retainer and joined to one another at the interiormost extents thereof, one of the fingers defining an average section modulus greater than the average section modulus of the other finger.

The foregoing and other objects and features of the invention will be evident from the following detailed description of preferred embodiments thereof and from the drawings in which like reference numerals identify like parts.

DETAILED DESCRIPTION OF THE PREFERRED EMBODIMENTS

Figure 1:
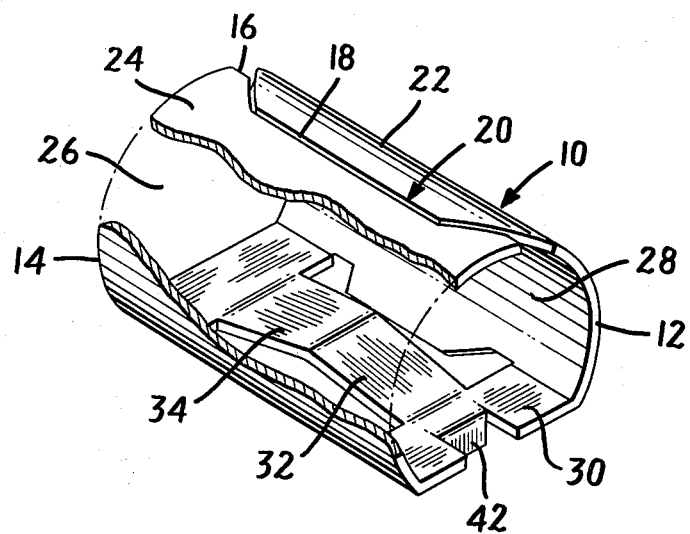
FIG. 1 is a perspective view of a retainer constructed in accordance with the invention partly broken away to show detail.
Figure 2:
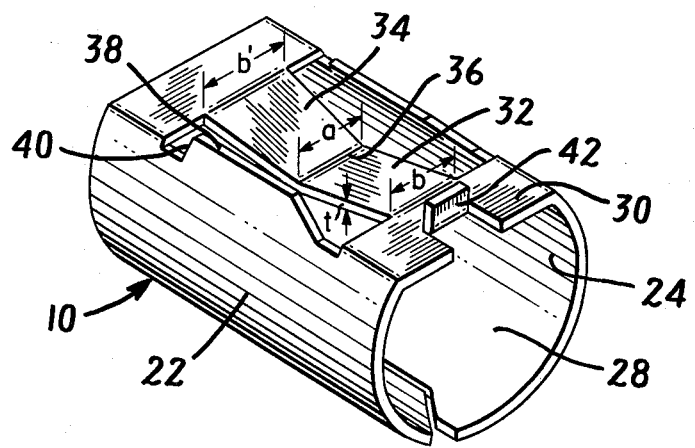
FIG. 2 is a further perspective view wherein the retainer is rotated about its longitudinal axis and thus inverted with respect to the FIG. 1 showing.

Referring to FIGS. 1 and 2, retainer 10 is of generally tubular configuration and is desirably formed of an integral piece of sheet material suitable for spring tempering, e.g., 1075, 1050 carbon steel, berrylium, copper and the like, having lateral margins 12 and 14 and ends 16 and 18. The sheet is manipulated such that the sheet lateral margins define opposed ends of the tubular retainer and the sheet ends are juxtaposed with one another, spaced apart by a longitudinally extending slit 20. Immediately adjacent the slit, and thereby separated, are a pair of sections 22 and 24 which together constitute a first arcuate part of the retainer periphery at each of ends 26 and 28 thereof. The retainer end peripheries are further defined by a substantially straight or flat second part 30.

As will be readily recognized by those familiar with the aforementioned retainers heretofore known, the retainer configuration is of customary D-shape and is adapted for insertion in a D-shaped recess of an operating element and in turn defines a hollow interior of D-shape suitable for receiving the D-shaped extension of an otherwise circular control shaft.

Adjacent retainer ends 26 and 28, retainer periphery second part 30 supports spring fingers 32 and 34 extending longitudinally into the hollow interior of the retainer, the spring fingers being joined at their interiormost extents, i.e., at location 36 (FIG. 2). Where the retainer is comprised in its entirety of an integral sheet of material, the transverse portion of the sheet intended to provide the retainer periphery second part is suitably cut away and bent along location 36 such that the spring fingers are themselves integral with each other and with the remainder of the retainer. In such spring finger forming operation, material for use in forming projection 38 is retained, such projection being tapered at its end 40 to define a cutting edge which is forced into the inner wall encircling the recess of the operating element in the course of retainer insertion therein.

Locating tab or key 42 is desirably formed at retainer end 28, to prevent insertion of that end in the operating element recess prior to insertion therein of the opposite retainer end. As shown tab 42 extends outwardly from periphery second part 30.

The retainer periphery is of transverse expanse somewhat larger than the corresponding transverse expanse of the operating element recess. Accordingly, upon insertion of one of the opposed retainer ends in the recess, the transverse extent of slit 20 is reduced and arcuate sections 22 and 24 are forced toward one another to define compression spring means resiliently engaging the interior walls of the operating element and projection 38 cuts into the operating element interior walls. Upon subsequent insertion of the control shaft extension into the retainer, the same is frictionally engaged initially by the leading spring finger 32 and thereafter, at location 36, by both spring fingers, the spring fingers thus also defining compression spring means assisting in the securement of the assembly of the operating element and control shaft. As alluded to above, since the spring fingers desirably extend interiorly from retainer periphery straight part 30, and not from arcuate sections 22 and 24 in the illustrated embodiment, the securement of the assembly is dependent on shaft extension height tolerance rather than shaft extension diameter tolerance.

In the illustrated retainer, common length spring fingers 32 and 34 are of equal thickness $t$ (FIG. 2) and extend longitudinally from location 36 at an initial common width, i.e., width $a$, to respective different end widths, $b$ and $b'$. The section modulus ($I/c$) of both fingers at their end of joinder, location 36, is identical and may be expressed for the rectangular cross-section fingers as $1/6(a)(t)^2$. At its other end, finger 32 has the section modulus $1/6(b)(t)^2$ and at its other end, finger 34 has the section modulus $1/6(b')(t)^2$. In accordance with the invention as practiced with equal thickness flat fingers, $b'$ is selected greater than $b$, whereby spring finger 34 has a greater average section modulus than does spring finger 32. Thus, the section modulus of spring finger 34, averaged from its low limit $-1/6(a)(t)^2$ — to its high limit — $1/6(b')(t)^2$ — defines a value greater than the section modulus of spring finger 34, averaged from its same low limit to a lesser high limit — $1/6(b)(t)^2$. By this arrangement, the invention provides a higher average section modulus for the spring finger which is more heavily loaded, i.e., subject to greater bending moments upon control shaft insertion. By reason of the location of spring finger 32, having the lesser average section modulus, adjacent tab 42, it is assured that spring finger 34 having the greater average section modulus, will be in position to be more heavily loaded upon shaft insertion. Stress distribution as between the cooperative spring fingers is thus equalized as contrasted with the unequal stress distribution otherwise obtaining.

Different average section moduli for the cooperative spring fingers may be attained by other configurations as will now be evident to those skilled in the art. For example, one spring finger may define an arcuate cross-section and the other spring finger a rectangular cross-section. In practice, equalization may be facilitated by observing bending moments attending usage of spring fingers and by the increasing of the section modulus of the more highly loaded spring finger until desired stress distribution is achieved.

The invention contemplates the use of different average section moduli for the cooperative spring fingers where the same are embodied in the retainer periphery arcuate part as contrasted with the illustrated embodiment thereof in the retainer substantially straight periphery part. Retainers of the invention constructed with the spring fingers in the retainer arcuate periphery part have dependency on shaft diameter tolerance but nevertheless exhibit the advantageous equalization of stress distribution.

Retainers constructed in accordance with the invention, and not coated as discussed presently below, exhibit extraction force to insertion force ratios in the range of 0.75 to 0.80, as contrasted with the extraction force to insertion force ratios of from 0.60 to 0.65 exhibited by retainers heretofore commercially available.

The invention contemplates further the application of a coating to retainers constructed in accordance therewith to further improve extraction force to insertion force ratios. The retainers may thus be dipped in or sprayed with a formulation of molybdenum disulfide or other lubrication solids, e.g., graphite and the like and then baked to evaporate the solvent and cure resins therein. Such coated retainers exhibit extraction force to insertion force ratios of from 0.85 to 0.90. Particularly unexpected results are attained in this aspect of the invention, as now discussed.

In using a lubricant it would be expected that insertion force would thereby be decreased and that the extraction force would also thereby be decreased, but proportionally less than the decrease in insertion force, since some of the lubricant would be removed from the retainer in the course of shaft insertion. Accordingly, it would be expected that the ratio of extraction force to insertion force would be increased, i.e., would further approach unity, based principally on a reduction of the denominator in the ratio. In actual practice, it has been determined, when a lubricant is used, that insertion force is decreased as expected but that extraction force increases above and beyond its value in the absence of a lubricant. As a result, in accordance with this aspect of the invention, the ratio of extraction force to insertion force is increased both by reason of an increase in the numerator and a decrease in the denominator thereof.

As illustrated in the drawings, longitudinal slit 20 includes terminal portions which do not extend in alignment with the mid-portion but rather are skewed therefrom. This feature is of particular importance in automatic assembly of retainers, serving to substantially reduce the tendency for adjacent retainers to engage one another along their longitudinal slits in handling and storage. The overall configuration of the retainer construction shown in the drawings, the lack of non-functional parts thereof and the disposition of tab 42 serve to further contribute to the ease of manufacture and usefulness of the retainers.

Various changes of and modifications to the foregoing embodiments now made evident to those skilled in the art may be made without departing from the present invention. Accordingly, the embodiments particularly discussed herein and described in the drawings are intended in an illustrative and not in a limiting sense. The true spirit and scope of the invention is defined in the following claims.

What is claimed is:

1. A retainer for securing an operating element to a control shaft, said operating element having an inner wall defining a recess of like configuration to that of an end of said shaft, said retainer comprising an elongated member having a periphery terminating in first and second opposed ends, said periphery defining a hollow interior, the transverse cross-section of said periphery being in first part arcuate and in second part substantially straight, said periphery first part incorporating a slit separating a pair of arcuate sections thereof, said slit being reduced in transverse extent upon insertion of said elongate member in said operating element recess, said sections thereupon defining first compression spring means for resiliently engaging said operating element inner wall, said periphery second part embodying second compression spring means extending therefrom into said elongate member interior for frictionally engaging said shaft end upon insertion thereof in said elongate member interior said second compression spring means comprising first and second spring members extending longitudinally interiorly respectively from adjacent said elongate member first end and from adjacent said elongate member second end and being joined to one another at the interiormost extents thereof, the average section modulus of said second spring member being greater than the average section modulus of said first spring member, said elongate member first end being adapted to receive said shaft end.

2. The retainer claimed in claim 1 further including key means supported adjacent said elongate member first end for preventing insertion of said first end in said operating element recess prior to insertion therein of said elongate member second end.

3. The retainer claimed in claim 1 wherein said second spring member has a section modulus greater than the section modulus of said first spring member at respective section locations thereof equidistant from the location of such joinder thereof.

4. The retainer claimed in claim 1 further including means projecting outwardly of said retainer periphery substantially perpendicularly to said second periphery part for cuttingly engaging said inner wall of said operating element.

5. The retainer claimed in claim 1 wherein said second compression means includes a lubricant on the surface thereof engageable with said shaft end.

6. The retainer claimed in claim 5 wherein said lubricant comprises molybdenum disulfide.

7. The retainer of claim 1 wherein said slit has a first portion extending in alignment with the longitudinal axis of said elongate member and has a second portion continuous with said first portion and skewed relative to said elongate member longitudinal axis.

8. A retainer for securing an operating element to a control shaft, said retainer comprising an elongate member having a pair of opposed ends and a periphery therebetween defining a hollow interior in which said control shaft is insertable, and spring means supported by said elongate member for resiliently engaging said control shaft, said spring means comprising first and second spring members extending longitudinally interiorly respectively from each one of said pair of elongate member ends, said spring members being joined to one another at the interiormost extents thereof, one of said spring members having a greater average section modulus than the other of said spring members, the spring member having the lesser average section modulus being located proximal to said one of said pair of opposed ends through which said control shaft is insertable.

9. The retainer claimed in claim 8 wherein the transverse cross-section of said elongate member periphery is in first part arcuate and in second part substantially straight, said periphery first part incorporating a longitudinal slit separating a pair of arcuate sections thereof.

10. The retainer claimed in claim 9 wherein said spring means is located in said elongate member periphery second part.

11. The retainer claimed in claim 8 wherein said first and second spring members include a lubricant on the surface thereof engageable with said control shaft.

12. The retainer claimed in claim 11 wherein said lubricant comprises molybdenum disulfide.

13. For use in securing an operating element to a shaft, said operating element having a recess extending interiorly therein from an open end thereof, a retainer disposed in said operating element recess and having a first end inwardly in said recess of a second opposed end of said retainer, said retainer defining a hollow interior for receiving said shaft and having spring means for resiliently engaging said shaft, said spring means comprising first and second spring members extending respectively from said retainer first and second ends, said first spring member having a greater average section modulus than said second spring member.

* * * * *